United States Patent [19]

LaRocca et al.

[11] 4,047,003

[45] Sept. 6, 1977

[54] COMMUNICATION CONTROL SYSTEM

[75] Inventors: James J. LaRocca, La Grange; Richard A. Mazur, Downers Grove, both of Ill.

[73] Assignee: Continental Can Company, Inc., New York, N.Y.

[21] Appl. No.: 675,608

[22] Filed: Apr. 9, 1976

Related U.S. Application Data

[63] Continuation-in-part of Ser. No. 570,430, April 22, 1975, abandoned, and a continuation-in-part of Ser. No. 570,407, April 22, 1975, abandoned.

[51] Int. Cl.² .................... G06F 15/46; G08C 15/00
[52] U.S. Cl. .................. 235/151.11; 318/562; 364/900
[58] Field of Search ............ 235/151.11, 151.1; 340/172.5; 318/562; 444/1; 179/15 R

[56] References Cited

U.S. PATENT DOCUMENTS

| | | | |
|---|---|---|---|
| 3,559,256 | 2/1971 | Lemelson | 235/151.11 UX |
| 3,576,540 | 4/1971 | Fair et al. | 235/151.11 X |
| 3,626,385 | 12/1971 | Bouman | 235/151.11 X |
| 3,636,525 | 1/1972 | Inaba et al. | 235/151.11 X |
| 3,641,326 | 2/1972 | Harte | 235/151.11 |

Primary Examiner—Joseph F. Ruggiero
Attorney, Agent, or Firm—Diller, Brown, Ramik & Wight

[57] ABSTRACT

A plurality of multi-functioning machines are simultaneously controlled by similar transmitter/receiver pairs, one of which is associated with a programmable controller and the other of which is associated with a machine. In the controller terminal, each transmitter of one such pair transmits a series of groups of serial command signals while its receiver receives corresponding groups of serial condition-responsive signals from the machine which update the controller. In the machine terminal, the transmitter of the other pair is connected to the controller receiver and the receiver is connected to the controller transmitter. Each transmitter derives input from a multiplexing matrix and each receiver outputs its information through a demultiplexer matrix. Each transmitter/receiver pair is driven by a free-running clock but the pair associated with the machine is slaved to the controller transmitter. Provision is made for connecting a series of machine pairs to a single controller pair, and data transfer between transmitter/receiver pairs is blocked upon detection of transmission breakdown.

27 Claims, 9 Drawing Figures

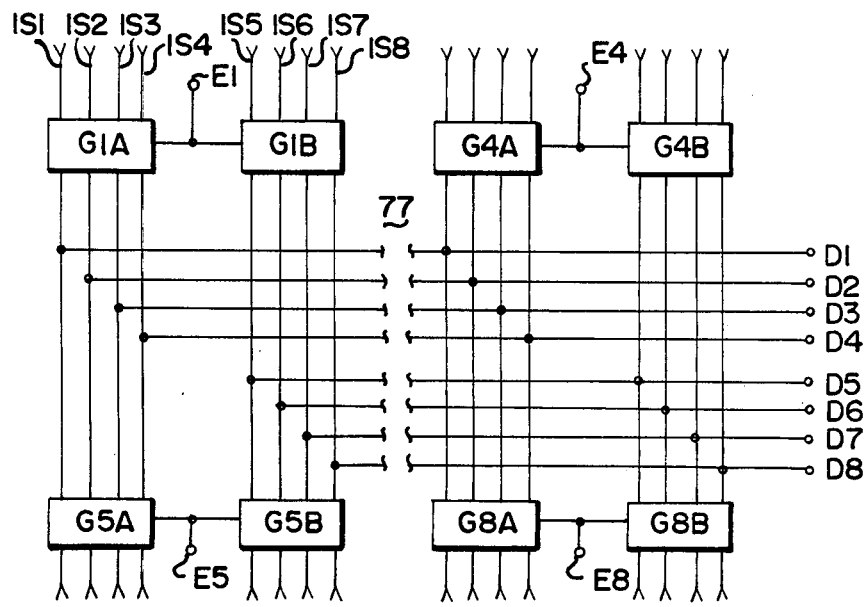
FIG.4
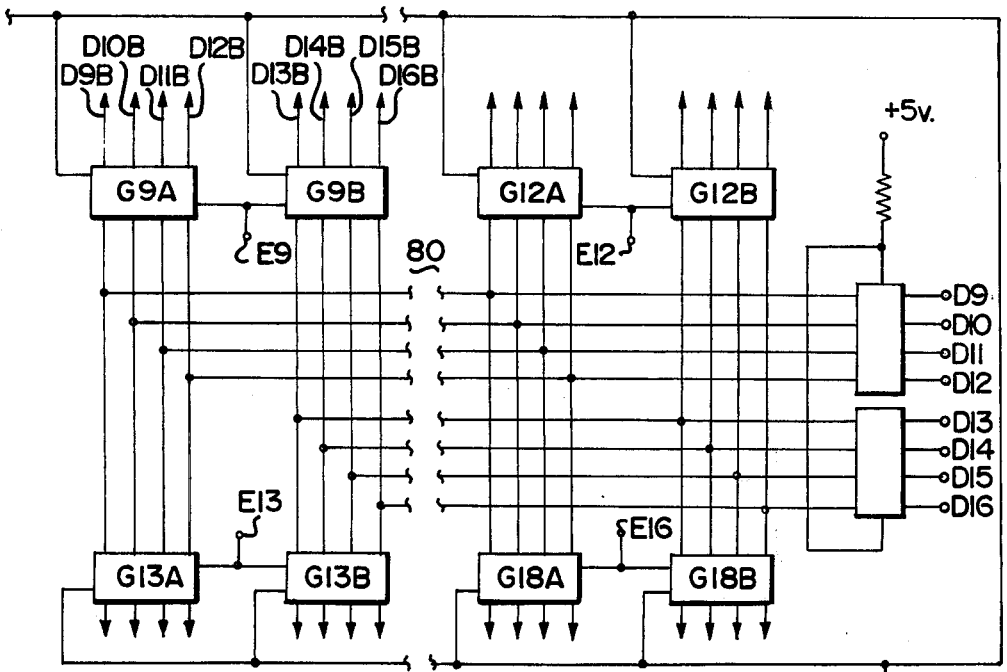
FIG.5
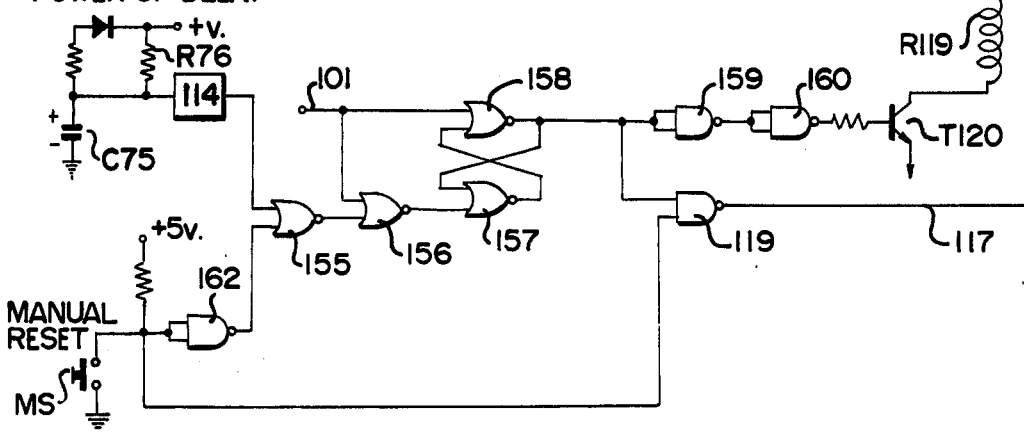

COMMUNICATION CONTROL SYSTEM

This application is a continuation-in-part of copending applications Ser. Nos. 570,407 and 570,430 filed respectively on Apr. 22, 1975 and which copending applications are now abandoned.

This invention relates in general to machine operation control systems and, more specifically, to a method of and apparatus for monitoring and controlling the operation of preselected functions of individual machines in a plurality of machines.

More particularly, this invention relates to a digital communications system wherein specific operational functions of each machine in a series of machines are monitored and controlled from a single control subsystem or controller to assure individual machine performance in accordance with a predetermined program.

In all manufacturing and production operations, it is necessary to monitor and control the operation of the equipment used in the production and manufacturing processes. In certain applications this monitoring and controlling function is performed by the individual machine operator who may control more than one machine, depending upon the number of operations which must be monitored, and the frequency with which changes occur in these conditions and operations. However, the capabilities of an individual machine operator to control and monitor the equipment which is being utilized are limited. Therefore, it has been attempted to monitor the operation of these machines and to control their functioning through the use of a predetermined control program which monitors the various functions and conditions of a machine and controls the operation of the machine in response to these monitored conditions to insure satisfactory operation.

One attempt to provide such a solution to this problem has been the use of a controller which is programmed to couple predetermined control or command signals to the machines in the event a predetermined condition is detected thereby causing the command or control signal to be generated. In certain of these applications the detector or sensor which monitors the condition or operation, and the programmer or controller which generates the responding command signal, are each electrically coupled one to the other by wire pairs. This coupling or hard wiring necessitates a substantial expenditure of money for labor costs as well as the materials utilized in hard wiring the machine to the controller. Such a system obviously requires a controller to be in close proximity to the machine from a physical standpoint due to the large number of wire pair connections which must be made between the units.

Another attempt to provide a satisfactory solution to this problem has been the use of various multiplexing systems using a common transmission line or signal carrier between the machine and the controller wherein each of the individual functions of the machine which are monitored and the responding control signal generated to control proper machine operation are all transmitted by the common signal carrier. Such systems overcome the difficulties associated with hard wiring each monitor or sensor to its respective controller since they utilize a common transmission line, but they are limited as to the number of conditions which can be monitored within a given time frame.

In such a system each of the functions is sequentially monitored and the corresponding control signal coupled to the sensor. Such a system not only controls changes in the state of the sensed condition in response to the programmed control, but also insures that the correct state is maintained. These systems address each sensor and generate a command or control signal to the machine at every address regardless of a change of state in the controlled function or operation. Such a redundant system is satisfactory in applications where the number of monitored conditions is such that the entire system may be monitored or addressed within the limits of a predetermined maximum time frame. However, such systems are not satisfactory for use in monitoring a large number of inputs, or in smaller systems wherein the maximum time period within which a condition must be monitored or addressed is less than the time period required for the multiplexing system to complete its entire address cycle monitoring all terminals. In such systems if a monitored function were to change state immediately after the sensor has been addressed, the condition could not be changed until the next cycle - after all of the other machine functions or operations had been addressed and the corresponding command signal transmitted to each receptor. In many applications such a time or cycle period is too great.

In monitoring or controlling machine operations where the "redundant" type of multiplexing systems, such as previously discussed, are not suitable due to the cycle time delay inherent in this system, a priority system has been utilized. In such systems the functions or conditions are arranged in priority of importance and sequentially addressed in synchronism, but no command signal is transmitted unless a change of state has been detected. The individual sensors or detectors of each group are addressed, and, upon a change being detected, a command signal is generated to correct or change the condition or function. At the end of the tranmission cycle to that particular receptor, the entire functions or controls series are again addressed beginning with the highest priority function or control, and the addressing of the entire cycle restarted to continue until a change is detected. Such a system requires that each of the functions or controls which are to be monitored must be ranked according to their importance, and presents the problem that the lower ranked priorities may never be monitored.

In another type of priority system the monitored functions or controls are electrically coupled into two groups. The first group comprises a small number of high priority terminals and the second group contains the remaining monitored terminals. The high priority group is sequentially addressed and a command signal is generated for each of the functions in this group in the manner previously described with reference to the "redundant" type of muliplexing system. The remaining functions or controls are addressed, but no command signal is generated unless the sensor for these controls or functions has indicated that a change or a command signal is necessary.

Another type of priority multiplexing system utilizes a random access memory and a two-speed addressing rate which addresses all of the monitored conditions to determine a change of state requiring a response, but only transmits data through the common signal carrier upon the occurrence of a monitored event or the sensing that a response-requiring change has occurred. While this system eliminates the problems incurred by delay time due to the transmission of command signals to functions or controls which do not need a command signal for proper operation, they require further and more sophisticated electronics in that the individual monitors or detectors must be provided with additional informational data identifying the receptor to insure correct correspondence between the function monitored and the command signal generated in response since there cannot be any synchronization between the controller and the receiver. The resulting random transmission of control or command signals to the monitored receptors must, therefore, be accompanied by informational data which correlates the particular function or control which is being monitored and the command signal directed to change the state of a particular operation or function to insure that the command signal is coupled to the appropriate receptor. Such a system requires highly sophisticated electronics and is, therefore, expensive.

With all of the various types of priority systems which have been utilized, each of these systems is burdened with the inherent problem that, in order to give certain machine functions priority, other monitored functions must of necessity yield to these priorities. Therefore, the secondary or non-priority functions may become critical through lack of a command response being directed to the receiver because of the continued utilization of common signal carrier or transmission line by the higher priority informational data. Even though the various multiplexing systems discussed above are of benefit in minimizing the expenses incurred in monitoring and controlling the operations of a machine, such systems inherently present further problems which must be minimized in order to obtain an economical and commercially acceptable system.

It is therefore, an object of this invention to improve systems for monitoring and controlling the operation of production machinery.

It is another object of this invention to monitor the operational functioning and controls of a machine and to control its operation in accordance with a predetermined program.

A further object of this invention is to monitor and control the operational functions of individual machines though a probramable controller used to control the operations of a plurality of machines.

Still another object of this invention is to control multiple operations and functions of machinery through a controller coupled to the various monitoring stations by a common signal carrier.

Yet another object of this invention is to minimize hard wiring between programably controlled machinery and the programmed controller by utilizing a common signal carrier.

These and other objects are attained in accordance with the present invention wherein there is provided an information directing system coupling condition-defining signals generated by monitoring the operation of each of a series of multi-functioning machines to a programable controller wherein each of the monitored operations is controlled in accordance with a preselected program. The system monitors and controls individual machine operations of a series of machines by means of the preprogrammed command signals generated to control the monitored operations and couples the various condition-defining signals and responding command signals through a common signal carrier or transmission line.

Basically, the system comprises a controller-machine combination involving a programmable controller having groups of output lines which carry the machine command signals as updated by information obtained from the machines, and groups of input lines to which the corresponding information from the machine is routed so as to update the controller. A multiplexing transmitter/receiver assembly connected to the input and output lines of the controller and driven by a free-running clock simultaneously transmits the command signals information in multiplexed format and receives the groups of machines information for demultiplexed routing to the appropriate groups of controller input lines. A similar multiplexing transmitter/receiver assembly is connected to the machine and is likewise driven by a free-running clock simultaneously to receive/demultiplex the transmitted command signals for appropriate application to the machine controls and to transmit the machine data in multiplexed format back to the controller-associated assembly. Each transmission cycle is characterized by the successive transmission of the individual groups of command or machine-information signals, followed by a "dead" time whereafter the cycle repeats. The machine-associated receiver utilizes this dead time not only to maintain its transmitter and receiver in synchronism but also to slave/synchronize the machine assembly to the controller assembly despite the fact that each is driven by a separate free-running clock system. The transmission from the two assemblies of each controller/machine combination occur concurrently but it is the transmission from the controller-associated assembly which controls the system because the event marked by the ending of its transmission cycle is that which is employed to control or synchronize the machine-associated assembly.

Further objects of this invention, together with additional features contributing thereto and advantages accuring therefrom will become apparent from the following detailed description of one embodiment of the present invention when read in conjunction with the accompanying drawings, wherein:

FIG. 4 is a circuit diagram of a machine-associated transmitter multiplexer matrix;

FIG. 5 is a circuit diagram of a machine-associated receiver receiver demultiplexer matrix;

As is well known, certain operation characteristics of machinery are capable of being determined through the use of, for example, microswitches, limit switches, photo-sensors, or other suitable condition responsive devices. These operating functions or characteristics indicate normal operation as well as malfunctions of the machines, and in many instances the operations are interdependent such that a change in one operation requires a coordinate response in another operation to insure continuous satisfactory production.

There is in the logic block diagram plurality of multi-functioning machines, M1 - MX individually coupled to a centrally located programming controller 12, by means of transmission lines T1-T8. The programmable controller 12 is programmed with a program compatible with the controller's programming panel to control a number of machines or processes. Since the speed of operation of the controller is so much faster than that of the parallel coupled machines, the controller can communicate with and thus operate one or more of the machines concurrently and essentially independent of the other machines. The programming controller 12 receives the information from various sensors in each of the machines, the formation is correlated by the controller and data in response to the information from the sensors is coupled to each of the individual machines to control its operation. The controller 12 is a solid-state modularized system designed to control operations or processes that can be logically arranged into a number of discrete steps of logical expressions, each with just two states; i.e., status inputs are either on or off, and the control operation selects outputs and turns them on or off. This type of control sequence is used in mass-production equipment and materials handling systems as found in such varied industries as automotive, steel and food processing and is commercially available as Model DEC 14/30 Industrial Control System Model 14/30 manufactured by the Digital Equipment Corporation, Maynard, Massachusetts. The DEC 14/30 system uses a replaceable memory to direct specific control operations. Convenient computer programming techniques allow the user to design a memory to suit his unique control needs, and the entire control process can be redefined by changing the memory.

The DEC 14/30 System is designed to operate independently or with computer monitoring or control. Since the DEC 14/30 can access all control inputs and outputs, the monitoring components may be a general purpose computer and a suitable interface device. Further, a group of DEC 14/30 Systems can be monitored by a single computer using a multiplexer to provide status and malfunction reports for a large control complex.

Figure 1:
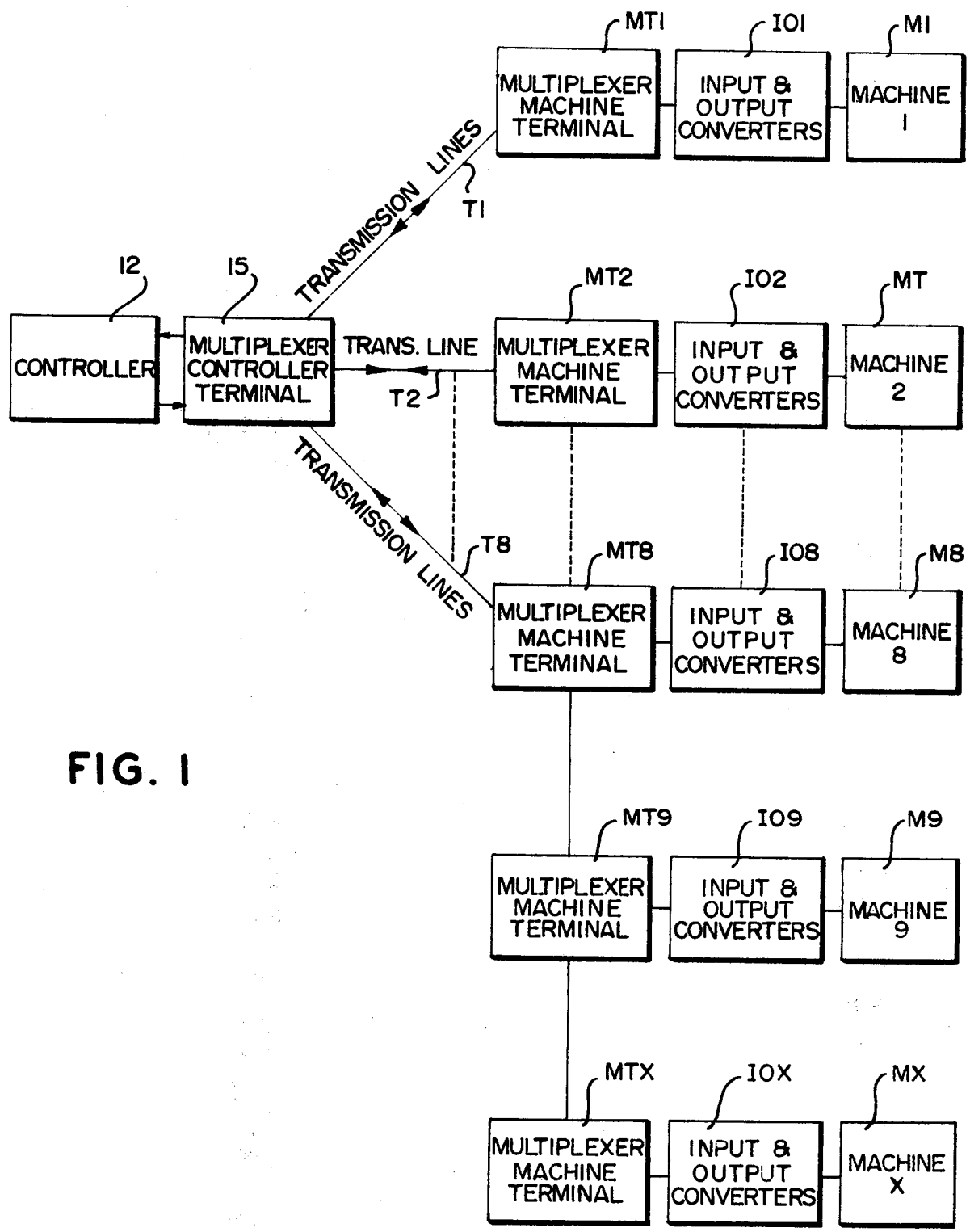
FIG. 1 is a block diagram of a machine control system which may be constructed according to this invention.

As shown in FIG. 1, controller 12 provides a multitude of condition-responsive command signals through a multiplexer controller terminal 15 and the transmission lines labeled T1, T2 - T8 to respective Multiplexer Machine Terminals MT1, MT2 - MTX. Each of the Multiplexer Machine Terminals MT1, MT2 - MTX is coupled to respective input and output converters labled I01, I02-I0X to respective machines M1, M2 - MX.

Conversely, the Multiplexer Machine Terminals MT1, MT2 - MT X couples a multitude of condition-defining information signal outputs indicative of the respective machine M1, M2 - MX through transmission lines T1, T2 - T8 to the Controller terminal 15. More specifically, and as will be explained further hereinbelow, when a machine, for example, Machine M1, changes its status or position, converter I01 converts the new status or position information to logic level data which Multiplexer Machine Terminal M1 translates to binary data which is coupled back through transmission line T1 and controller terminal 15 to the controller 12. Controller 12 compares this new machine data with the pertinent programmed or control information to continue the operation in progress, to initiate a new operation as required, or change the operation.

Figure 2:
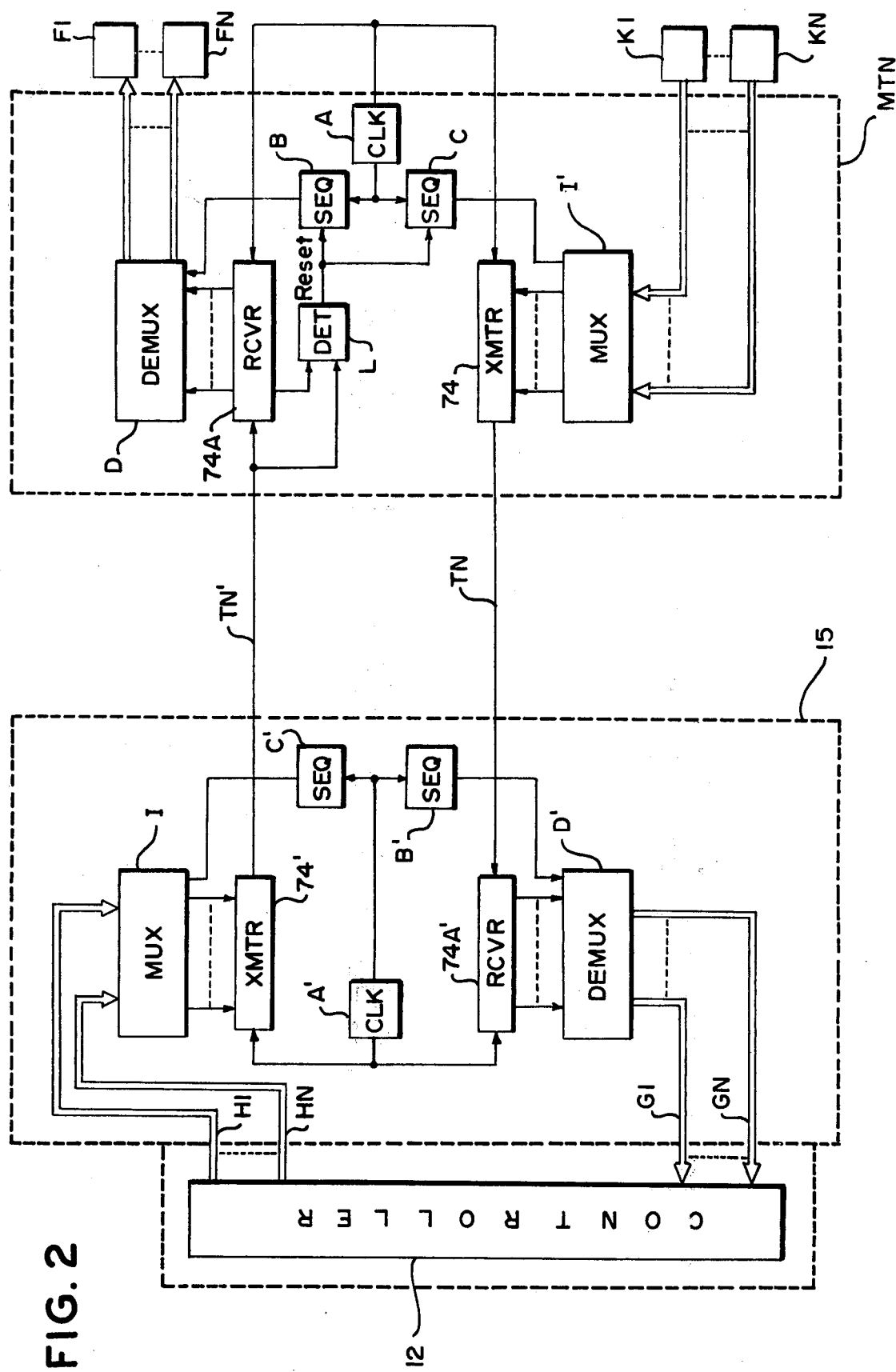
FIG. 2 is a block diagram illustrating certain principles of each basic controller/machine system.

The basic operation of the system is illustrated in FIG. 2 which diagrammatically illustrates one multiplexer machine terminal system MTN and the corresponding portion of the multiplexer controller terminal system 15. The two systems include the respective free-running clocks A and A', which drive the receiver demultiplexer sequencers B and B' and the transmitter multiplexing sequencers C and C' at a relatively slow byte rate while driving the respective UAR/T transmitters 74 and 74' and the UAR/T receivers 74A and 74A' at a relatively rapid rate. The units 74 and 74' (and also 74A and 74A') contain internal divide-by-sixteen counters so that the bit rate of the system is one-sixteenth that provided by the inputs of the clocks to these units. The transmitters 74 and 74' accept parallel bit inputs and transmit them serially, together with start, stop and parity bits to the receivers 74A and 74A' respectively, whereas the receivers accept the serialized bytes and output them in parallel. The demultiplexers D and D', under control of the sequencers B and B' sequentially step the byte information to the groups of controlled devices F1 - FN and to the controller over the input lines G1 - GN. Dependent upon the controller program as influenced by the inputs at G1 - GN, the controller outputs the command signals at the lines H1 - HN. These commands are multiplexed by the multiplexer I, serialized by the transmitter 74', received by the receiver 74A and provided as parallel outputs thereby to the demultiplexer D where they are sequenced to the appropriate groups of controlled devices F1 - FN. The groups of sensors K1 - KN monitor the corresponding controlled devices F1 - FN and provide the inputs to the multiplexer I' which are applied in sequence to the transmitter 74, serialized therby, and which ultimately appear as the updating data at the controller input lines G1 - GN.

The two sequencers B and C are controlled by an end-of-transmission detector L to be reset simultaneously thereby. The sequencers operate, in principle, as if there are N+1 states, N being the number of the groups F1 - FN or groups K1 - KN, etc., with there being only N transmissions (and corresponding receptions) per cycle. In this way, there is a dead byte period separating successive cycles which is used to detect end-of-transmission by the controller assembly. Since the two sequencers A and C are reset simultaneously, they remain synchronized so that each cycle starts with the reception of the first group of command signalsapplicable to the controlled device group F1 and the transmission of the first group of data signals from the sensor group K1. The detector L effectively slaves each machine terminal system to the controller terminal system and allows all of the clocks to be free-running. The only constraint on the clocks is that they all be sufficiently accurate so as to avoid such gross misphasing during any one cycle as would defeat the effect of the slave-inducing detector L.

FIG. 1 illustrates a possible arrangement of controlled machines. The controller 12 is connected to the multiplexer controller terminal 15 which comprises eight of the transmitter/receiver systems illustrated at the left-hand side of FIG. 2 connected respectively to the multiplexer machine terminals MT1 - MT8 each of which comprises a transmitter/receiver system as illustrated at the right-hand side of FIG. 2. Each group of sensors K1 - KN and controlled devices F1 - FN is associated with a corresponding machine M1 - M8 and are interfaced therewith by means of the input and output converters I01 – I08. Additionally, there are the two multiplexer machine terminals MT9 and MTX serially connected from the terminal MT8, as detailed hereinafter, and their corresponding input and output converters I09 and I0X and machines M9 and MX.

Figure 3:
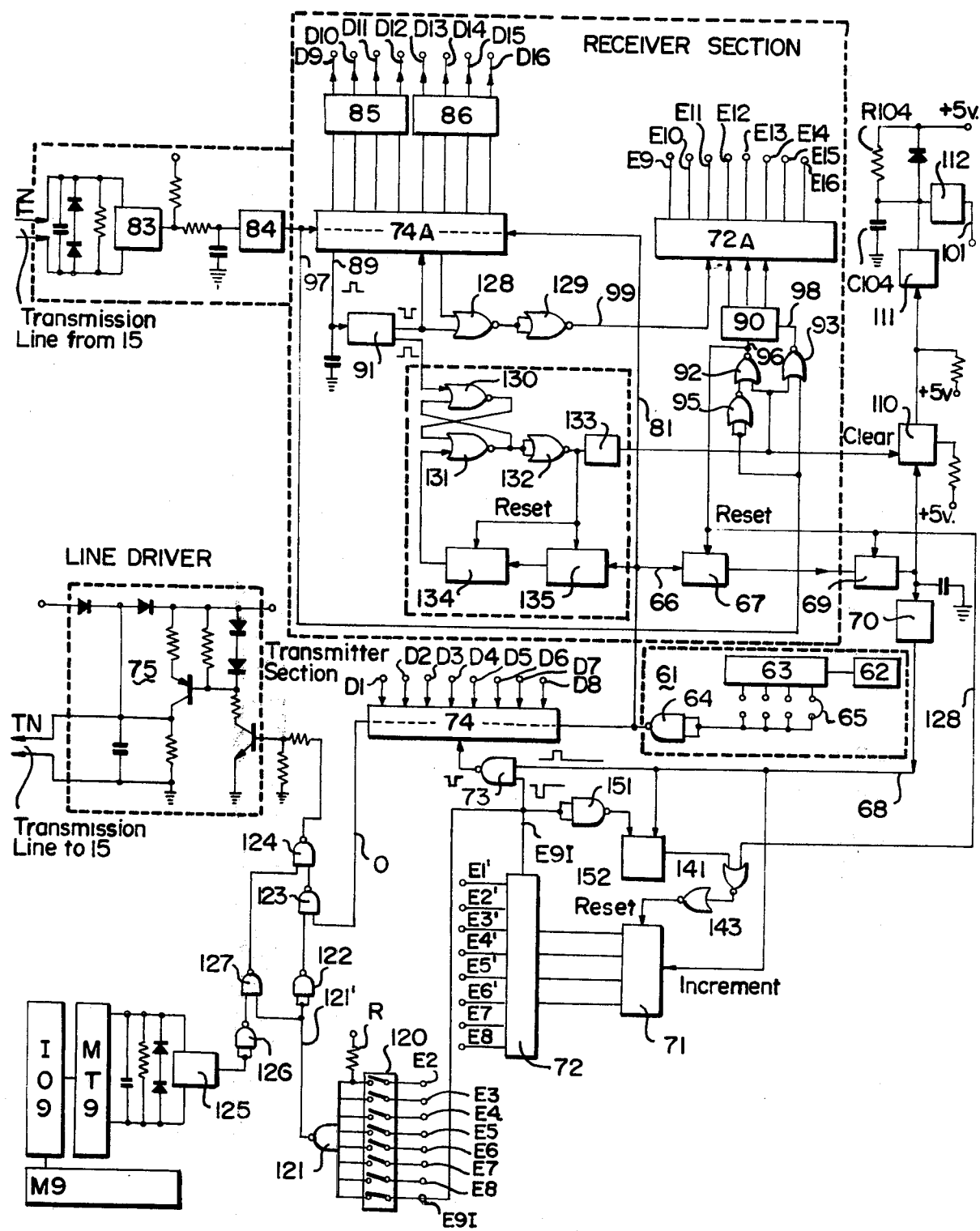
FIG. 3 is a circuit diagram illustrating a machine multiplexer terminal.

One of the Multiplexer Machine Terminals is shown in FIG. 3 and comprises a transmitter section and a receiving section. The transmitter section includes a clock 61, which is of any suitable known design and includes 1 MHZ oscillator 62, a 4-bit binary counter 63 and a NAND buffer gate 64. The counter 63 divides the 1 MHZ output from the clock 62 by two, four, eight or 16. In the embodiment shown, a jumper wire 65 is connected to counter 63 to divide by two and provide a 500 KHZ output. The clock 61 provides clock or timing pulses for the system, and particularly, to the units labeled UAR/T 74 and UAR/T 74A, as is well known in the art (units UAR/T 74A will be described hereinbelow).

The output from the clock 61 is coupled through lead 66 to another 4-bit binary counter 69. The oscillator 62 and counters 63, 67 and 69 comprise the clock A of FIG. 2, the output of the counter 69 being the byte rate clock output of that Figure. The output from counter 69 is coupled through a monostable multivibrator 70 and lead 68 to provide pulses to another 4-bit binary counter 71 which is the sequencer B of FIG. 2, to the NAND buffer gate 73 and to the multivibrator 152 for purposes to be hereinafter explained.

The counter or sequencer 71 is connected to provide a 4-bit binary output to a binary-to-decimal decoder 72. The decoder 72 is arranged to provide an output for the first 9 of the sixteen available states of the counter 71, the sequencer being then reset and the cycle repeats. To illustrate, assuming the sequencer 71 initially to be set to its inital state, output E1 will be low correspondingly to control the multiplexer matrix (I' of FIG. 2) as hereinafter described and each of the outputs E2 – E9I will be high. The gate 73 is thus enabled and the input from the inverter 151 will be low to the multivibrator 152. A positive byte rate clock pulse at the line 68 will thus provide an inverted pulse output from the gate 63, the leading edge of which will cause the transmitter 74 to latch the parallel input signals at D1 – D8, as dictated by the multiplexer matrix, and the trailing edge of this pulse will initiate serialization of these signals from the unit 74. At the same time, the trailing edge of the clock pulse on line 68 will cause the counter 71 to increment, returning E1 to its normal high state and causing E2 to go low correspondingly to index the multiplexer matrix. This sequence continues, driving the lines E3 – E8 successively low. The eighth byte rate clock pulse on the line 68 will initiate transmission of the eighth byte and will also drive the line E9I low, thus disabling the gate 73. The low state of the line E9I also enables the multivibrator 152 by providing a high input thereto through the inverter 151. The multivibrator 152 will produce an output pulse only when both inputs thereto are high with one of them negative-going. Thus, the multivibrator 152 will produce an output pulse at the trailing edge of the ninth byte rate pulse at line 68 and this will condition the gate 141 so that a coincidental reset pulse on the line 128 (as hereinafter described) will produce a negative pulse output from the gate 141 which, inverted by the gate 143 will reset the counter 71 to its initial state in which only the line E1 is low and the line E9I returns to its normal high state. Thus, it will be seen that every ninth byte rate pulse will be blocked by the gate 73 to provide a byte period dead time between successive cycles. It will also be noted that the reset signal on the line 128 also resets the counters 67 and 69 so as to syncrhonize the sequencer 71 with the receiver 74A from whence this reset signal is initiated and with the receiver sequencer 90 which is simultaneously reset. The delay or idle time corresponding to the ninth state of the decoder 72 is used as a marker for identifying and synchronizing the initiation of the scan cycles, as will be explained.

The transmitter/receiver units 74, 74A and 74', 74A' are one package solid state Universal Asynchronous Receiver/Transmitter devices (hereinafter also referred to as UAR/T) manufactured by General Instrument Corporation, Micro Electronics Division, 600 West John Street, Hicksville, New York, 11802. Each UAR/T unit includes a receiver section 74 or 74' which accepts asynchronous serialized characters and converts them to a parallel format. Each UAR/T unit also includes a transmitter section 74A or urA' which independently accepts parallel binary characters and converts then to a serial asynchronous output with start, stop and parity bits added.

The UAR/T is relatively versatile with the baud rate, bits per character, parity mode, and number of stop bits being externally selectable, and the unit will internally synchronize the start bits with the clock input. In the embodiment shown, the UAR/T units process eight data bits, a parity bit and the start and stop bits. It should be noted that the data transmission rate capability of the UAR/T is quite high as compared to the relatively low operating speed of machines M1 etc. The UAR/T has the capbility of transmitting approximately 40,000 baud or 4000 eight bit transmissions per second.

As mentioned above, the counter 71 and the binary-to-decimal decoder 72 generate the group-select address pulse. The decoder 72 transforms the binary output of counter 71 into one of eight mutually exclusive group-select pulses which is coupled to terminals E1–E8 to provide a group-select address. The terminals or leads E1-E8 are coupled to the like numbered terminals in FIG. 4 to apply the sequentially selected one out of eight groups of data bits which is applied to the UAR/T transmitter section 74.

When a strobe pulse is applied to the transmitter 74, strobing of eight bits enabled by the decoder 72 occurs. A clock pulse from dividers 67 and 69 and the multivibrator 70 is coupled through NAND gate 73 to UAR/T 74 to function as a strobe pulse.

With the beginning of a strobe pulse aplied to UAR/T 74, the strobing of eight bits selected by the decoder 72 occurs. The trailing edge of the strobe pulse will cause the bits in the particular group to be serially coupled out of the transmitter 74 through the line driver 75 and the transmission line.

The data bits D1 – D8 are coupled to UAR/T transmission section 74 in parallel and are transmitted through the transmission line in serial fashion as will now be discussed. FIG. 4 shows the multiplexer circuit assembly or matrix 77 for entering the data bits in parallel to the section 74. Circuit assembly 77 comprises eight identical switching circuits labeled G1A–G1B through G8A–G8B, each circuit including two buffer gates labeled generally A and B, which gates are enabled or inhibited by the respective enabling lines labeled E1–E8. In FIG. 4 for simplicity in the drawing, only four of the eight identical circuits are shown with the associated buffer gates. The enable lines E1–E8 will be driven low or enabled in a sequence from 1 through 8 as the decoder 72 (FIG. 3) is incremented. The enabling lines numbered E1–E8 are connected to the similarly numbered terminals of the decimal decoder 72 of FIG. 3.

As mentioned, decoder 82 selects and sequentially couples each of mutually exclusive groups of eight bits through matrix 77 to the UAR/T transmitter section 74. Thus, one of the eight lines E1–E8 is enabled during a given period and the remaining lines remain disabled. For example, when enable line E1 is low, the eight input lines or leads IS1, IS2 – IS8, which are connected to the input side of the two buffer gates G1A and G1B, effectively coupled through the matrix 77 to the output lines D1–D8. Output lines D1–D8 couple the bits in parallel to the similarly numbered terminals of the UAR/T transmitter section 74 of FIG. 3.

The input leads IS1–IS8 are connected to respective converters which will convert a relatively high 60 HZ voltage to selected logic levels. As is well known, such could be obtained, for example, by means of either a transformer or photo-optic system whereby a switch opening or closing in a 60 HZ line would be converted through a suitable component, such as a D. C. bridge, to a distinct logic level. The foregoing would provide condition-defining binary data information or signals to the circuitry of FIGS. 3 and 4 relating to the occurrence of an event in the associated machine. These condition-defining information signals received from the machine are converted through the Input/Output Converters IO1–IO9 and coupled as parallel bits (D1–D8) to the transmitter section 74. The UAR/T section 74 serializes the data bits and then couples the data through the line driver 75 and the transmission line T1 to the Controller Multiplexer Terminal 15.

The receiver section of FIG. 3 provides a means of receiving condition-responsive command signals from the Multiplexer Controller Terminal 15 through the respective associated transmission lines T1–T8 and couples or conveys this information through the associated input/output converter IO1–IO9 to the respective machine M1–M9 to affect its operation.

Serialized data from the Controller Terminal 15 is received from the transmission lines T1 through input gating and shaping circuits 83 and 84 which reshape and square the data bit pulses before they are coupled to the input of the UAR/T receiver 74A. The receiver 74A restructures the serialized data D9–D16 into an eight bit output (D9–D16) havving a parallel format and the parallel eight bits are coupled out through two Quad-input AND gates 85 and 86.

Concurrently, the designation as to where each particular group of eight bits is to be delivered is controlled by one of the eight outputs of a binary to decimal decoder 72A; decoder 72A being similar to decoder 72. At the beginning of each cycle, the multiplexer controller terminal commences transmission of the eight successive bytes which contain the command signals from the controller 12. At the end of each byte, a high signal is produced on the output terminal 89 of the receiver 74A. This signal is used either to increment or to reset the address counter or sequencer 90 as explained hereinafter, and to provide an input to the decoder 72A. Strobe pulses from the decimal decoder 72A determine which one of the eight output lines E9–E16 will go low and strobe the group of eight bits received by the receiver 74A. The decimal decoder 72A thus determines where each group of eight data bits applied to the receiver 74A and available at the output of AND gates 85 and 86 will be coupled to the machine. The demultiplexer matrix 80 is illustrated in FIG. 5 and its operation will be evident due to its similarity to FIG. 4.

Returning to FIG. 3, the end of a byte is signalled by a high signal at the output line 89 and this signal toggles the multivibrator 91 connected to operate as a flip-flop having a Q output to the gate 130 and a Q output to the gate 128. The Q output is also connected to the receiver 74A to reset the internal flip-flop which produced the high signal at the line 89. The two NOR gates 130 and 131 are cross-coupled as shown and when the Q output from the device 91 goes high, the normally low output of the gate 131 goes high and will remain so until the two counters 135 and 134 provide a clock pulse input to the gate 131. Normally, the counters 134 and 135 are held reset by virtue of the normally high output from the inverter 132. When the counters 134 and 135 have counted exactly thirty-two pulses from the counter 63, an input will be provided to the gate 131. This time delay (thirty-two pulses) corresponds to two bit periods, the UAR/T devices having internal divide-by-sixteen counters so that a bit period is equal to sixteen clock pulse outputs from the counter 63. When the gate 131 receives the input from the counter 134, the output of gate 132 returns to high state, resetting the counters 134 and 135 and causing the one-shot 133 to fire, producing a negative-going pulse output which is applied to the two NOR gates 92 and 93. Since this signal is delayed by two bits at the end of one byte, it will conincide with the first bit (the "start" bit) at the beginning of the next byte unless there is no next byte because the cycle has completed and the dead time is present at the input to the unit 74A. It will be noted that each byte consists of eleven pulse time slots, the first and last of which are assigned to the "start" and "stop" whereas the remainder are assigned to the eight data bits and a parity bit. Since each byte period contains twelve time slots, the aforementioned two bit period delay is necessary to assure that the delayed pulse will coincide with the "next byte" start bit. If there is a next byte, its start bit will cause the signal at the input 97 to be low when the two gates 92 and 93 are enabled by the one-shot 133 and both inputs to the gate 93 will be low so that it produces a positive output at the line 98 which increments the counter 90. The low signal on the line 97 will cause a high input, through the inverter 95, to the gate 92 so as to disable it. If, on the other hand, there is no next byte, indicating that the multiplexer controller terminal 15 (see FIG. 2) has completed a cycle, the signal at the line 97 will be high disabling the gate 93 while enabling the gate 92. Thus, the output from the one-shot 133 will produce an output from the gate 92 to reset the counter or sequencer 90, reset the counters 67 and 69 and reset the counter or sequencer 71 through the gate 141. Thus, the cycles of the machine terminals are slaved to the controller terminal transmissions.

The two gates 128 and 129 and their output at the line 99 to the decoder 72A are employed for parity purposes. As a byte is received and parity check indicates an improper bit, the output line to the gate 128 goes high. This prevents any output from the gate 128 when the normally high Q input to the gate 128 goes low at the end of a byte and the output from the inverter 129 will remain high so that when the counter 90 is incremented, a low signal will not appear at the corresponding line E9–E16 and the defective byte will not be demultiplexed to the machine. Thus, the output of the gate 129 constitutes an enable signal to the decoder 72A which, if parity checks, will go low in response to the output from the device 91.

It is necessary to insure that the Multiplexer Controller Terminal 15 and the Multiplexer machine Terminal MT1–MT9 generate waveforms at essentially the same rate. Accordingly, clocks (labeled 61 in FIG. 3) are provided at the various terminals which run at frequencies which match within approximately one percent. At each terminal phase synchronization is done internally by the UAR/T units 74 and 74A.

As noted, FIG. 5 shows a demultiplexer matrix system generally labeled 80 for connecting the eight bit parallel output from UAR/T 74 A to the associated input and output converter. The output of UAR/T 74A of FIG. 3 is coupled to the exclusive OR gates 161 and 163 of FIG. 6. Depending upon which of the enable lines E9–E16 are enabled by decimal decoder 72A, two each of the respective flip-flop circuits generally labeled G9–G18 are activated.

For example G9A and G9B pass the data through output of lines G9B–D16B to the input and output terminals of the machine to which these lines are coupled.

In systems such as described herein, there are generally two types of command situations in the control process of the system. In he first situation, action has to be taken to change the control or status of the machine. Such new command will be applied by the controller 12 to the Multiplexer Controller Terminal 15 where it will be placed into a signal format compatible with the circuitry of a Machine Terminal MT1–MTX. In the embodiment of the invention groups of eight data bits each will be serialized and coupled through the transmission lines T1–T8 to the machine terminals MT1–MT9. The receiver section of the respective Machine Terminal MT1–MTX will receive these commands, and these new commands will be applied to the machine actuators which will cause certain action.

In the other situation no action or change in an actuator has to be made and, normally, no data need be transmitted. However, in the present system, the Controller 12 will determine that the machine should remain in its current state, and a command to that effect will be transmitted to the machine to confirm the condition. While such transmittal of information is redundant, it also insures a reliable system.

It will be noted from FIG. 1 that the transmission line T8 serves the three machines terminals MT8, MT9 and MTX. This serial connection arrangement will now be described, but it will be understood that any one of the transmission lines may be used to serve two or more machine terminals if so desired.

Figure 9:
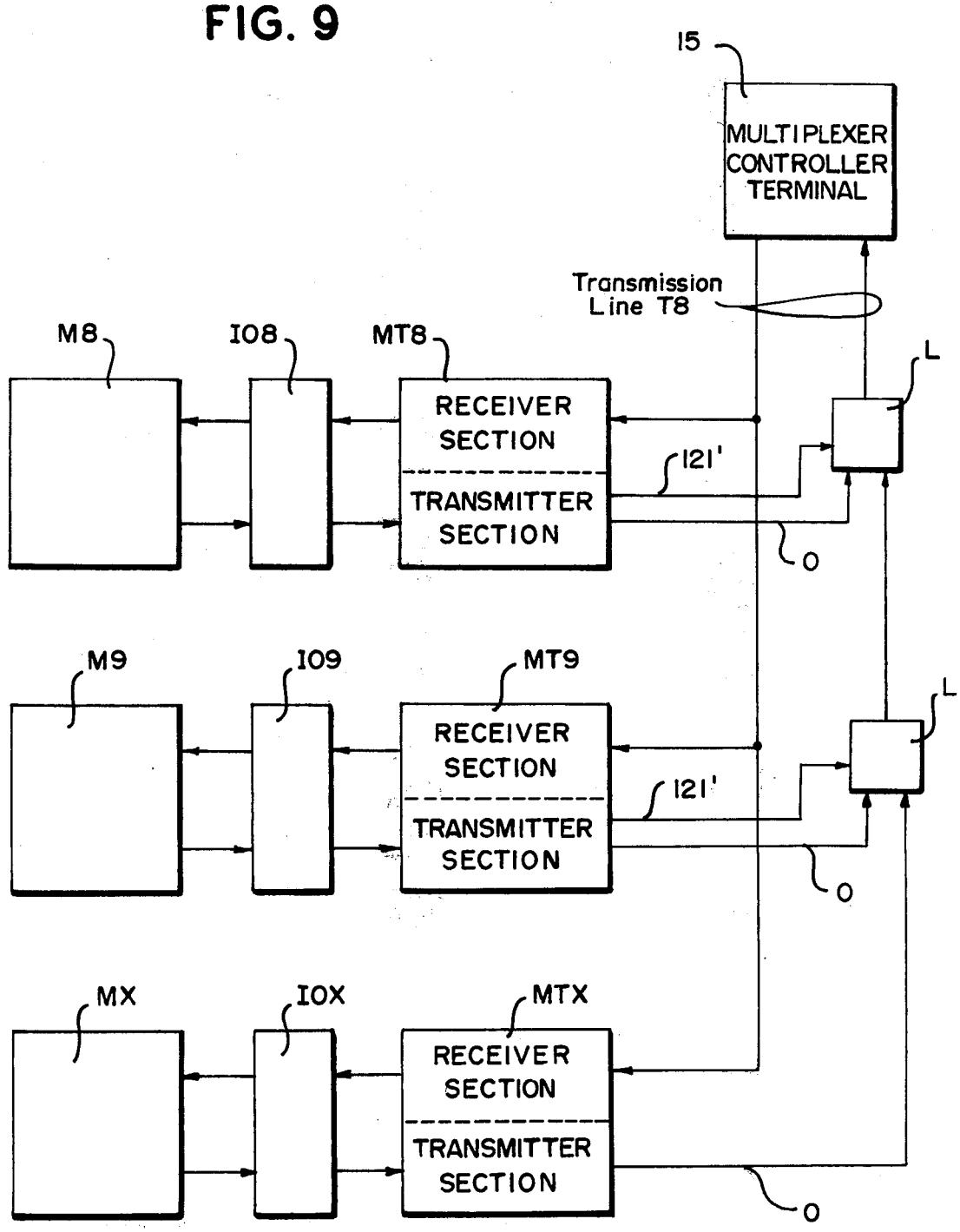
FIG. 9 is a block diagram illustrating the principle of machine serializing.

The basic principle of the serial arrangement is shown in FIG. 9 wherein it will be seen that transmissions from the controller terminal 15 are connected in parallel to the receiver sections of all three of the machine terminals MT8, MT9 and MTX. In this way, the controller terminal slaves each of the machine terminals to it, as described previously. The transmission output lines 0 from the several transmitter sections, however, are connected so that only one of them may be connected back to the controller terminal 15 during any particular byte period. For this purpose, the logic gates L are employed each under control of an input line 121' as shown. The details of a logic gate and the manner of control thereof are shown in FIG. 3.

In FIG. 3, the switch or jumper assembly 120 selectively connects one or more of the outputs E2–E9 of the decoder 72 and the NAND gate 121. Each of the inputs to the gate 121 normally is maintained high by connection to a positive voltage source through a suitable resistor, one of which is indicated at R in FIG. 3. If any one of the switches 120 is closed, the corresponding input to the gate 121 will go low when the corresponding output of the decoder 72 goes low, producing a high output at the normally low line 121'. A high signal on the line 121' will enable the NAND gate 127 and, because of the inverter 122, will inhibit the NAND 123. The inhibition of the gate 123 will maintain its output to the NAND gate 124 high so as to enable it. Thus, during any byte period corresponding to an open switch condition at the switch 120, the transmitter 74 of FIG. 3 will be connected through the transmission line to the controller terminal 15. If, one the other hand, the switch connected to the decoder line E4 for example is closed, then the gate 127 will be enabled and the gate 122 will be inhibited during the corresponding byte period and the transmitter of the machine terminal MT9 will then be connected back to the controller terminal 15. Thus, by programming the switch assembly 120, the machines MT8 and MT9 are connected in the time shared fashion to the controller terminal 15 during each cycle. If a third machine such as MTX is desired also to share the common controller terminal transmitter/receiver system, then the machine terminal 9 is provided with a switch assembly 120 and logic gate arrangement cooperating with the machine terminal MTX as shown in FIG. 9. In each case, the last machine terminal of the series (MT9 in FIG. 3) does not require the switching assembly 120 or the logic gate arrangement 122, 123, 124, 126, 127.

To provide a specific example, suppose the machine M9 is to transmit its condition-defining signals during the fourth byte period, the machine MTX is to transmit its condition-defining signals during the fifth byte period and the machine MT8 is to transmit its signals during the remaining byte periods. Then, only the swtiches of E4 and E5 of the transmitter section associated with the machine MT8 will be closed, and only the switch E5 of the transmitter section associated with the machine MT9 will be closed.

The receiver section of each machine terminal MT1–MTX are well as the corresponding receiver sections of the controller terminal 15 contain safety circuits which monitor or check whether the transmission of data is proceeding properly and, if not, to disenable the receiver demultiplexers to block the reception of data.

Figure 7:
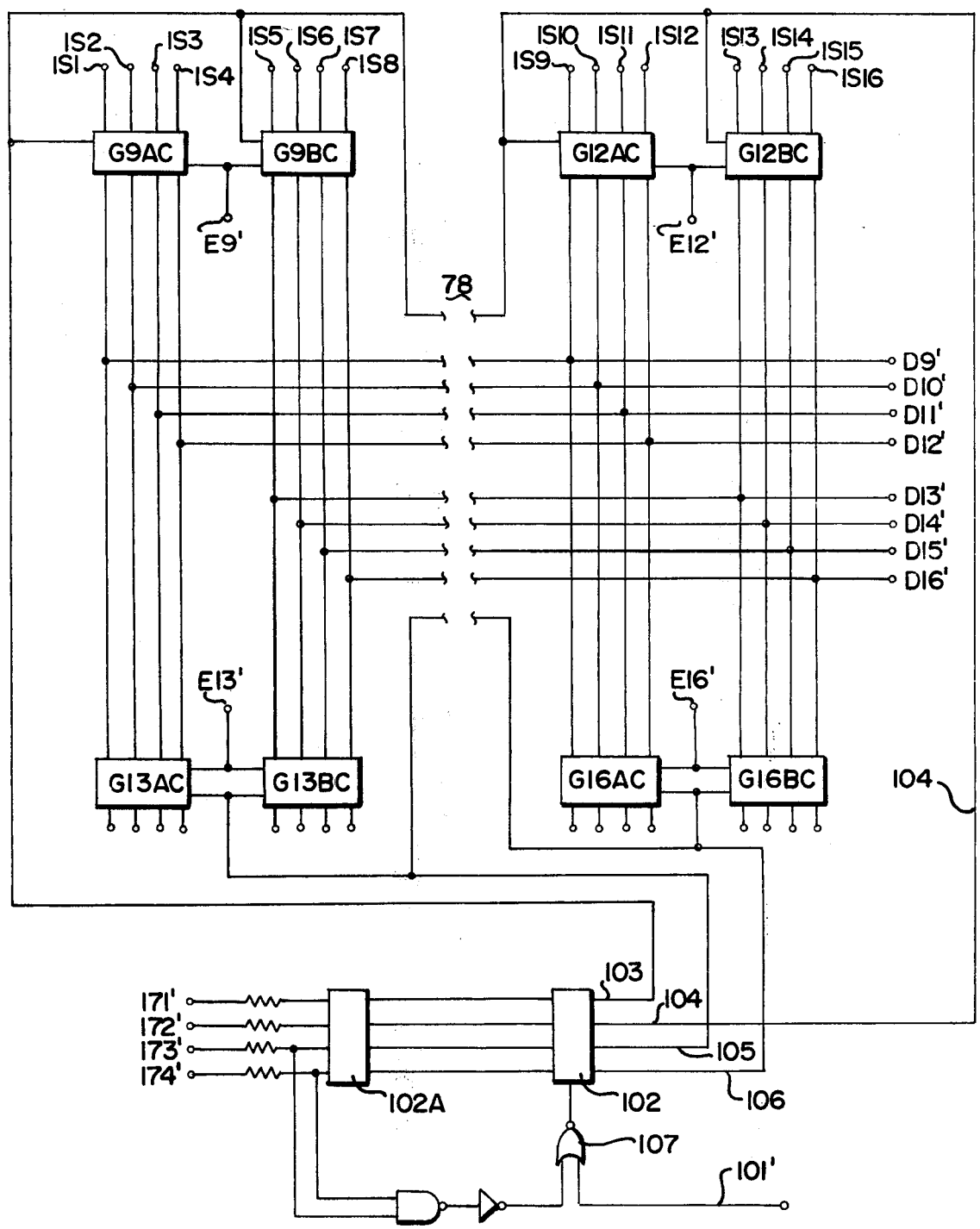
FIG. 7 is a circuit diagram of a controller-associated receiver demultiplexer matrix.

FIG. 5 illustrates the control associated with each machine terminal receiver demultiplexer matrix whereas FIG. 7 illustrates the control associated with each controller terminal receiver demultiplexer matrix. In FIG. 5, the safety signal is provided at the line 101 and will toggle the flip-flop formed by the cross-coupled NOR gates 157 and 158 to drive the normally high output of the gate low and correspondingly to provide a low input to the NAND gate 119, the other input of which normally is high. In consequence the output at the line 117 goes high and this signal disables all of the switching devices G9A–G18A and G9B–G18B, thereby to disable the demultiplexing matrix. Thus, no command signals appearing at the group of input conductors D9–D16 from the receiver 74A can be applied to any group of output lines D9B–D16B.

Once the high safety signal appears at the line 101, the system must be reset manually in order to toggle the gates 157, 158 to their normal state. The manual switch MS is provided for this purpose. Normally, the inputs to the inverter 162 are high so that the corresponding inputs to the NOR gate 155 is low, its other input also normally being low. Thus, the output from the gate 155 normally is high, independent of the state of the safety signal at the line 101. However, by depressing the reset switch MS, the output of the gate 162 goes high and that of the gate 155 goes low, thereby resetting the flip-flop 157, 158. This allows the matrix of FIG. 5 to operate normally.

The flip-flop 157, 158 also controls the transistor T120 through the buffer gates 159, 160 to cause it to conduct and energize the relay R119 when the output of the gate 158 goes low. The relay R119 is used to provide a visual or other signal that the demultiplexer matrix has been disabled.

The circuit of FIG. 5 also provides power-up delay to prevent matrix operation for a short period until the circuits have "settled" incident to power being turned on. This is achieved by the R-C circuit R76, C75. When power is first turned on, a finite time will be required to charge the capacitor C75 and, until it does, the output from the multivibrator 114 to the gate 115 will remain high. When this input to the gate 155 goes low, the flip-flop 157, 158 will be toggled to its normal state.

FIG. 7 shows the safety circuit control arrangement for a controller terminal receiver demultiplexer matrix. The condition-defining signals from the corresponding machine terminal transmitter come in over the transmission line and the controller receiver outputs them in parallel at the lines D9'–D16'. The controller 12 handles sixteen of these signals at a time and for this reason the latches G9AC – G16AC and G9BC – G16BC are separated into groups of four. The four inputs to the buffer 102A are enabling signals from the controller 12 and appear one at a time and are applied to the switching circuit 102. If the input from the NOR gate 107 to the circuit 102 is high, the switch 102 will pass the appropriate enabling signal to one of the groups of four latches of the matrix, allowing them to latch their inputs in accord with the addresses E9' – E16'. Any two of these enabling inputs are NANDed as shown so that if either one or both of them are low, a low input will be applied to the NOR gate 107. The other input to this gate is the safety signal on the line 101' which, as described before, normally is low. Either the presence of a high signal on the line 101' or the presence of a high signal at the other input to the gate 107 will cause the switch 102 to open and block the enabling signals.

The manner of generating a safety signal will be seen from FIG. 3. The multivibrator 112 will produce a high output pulse at the line 101 whenever its input is low. During normal operation the capacitor C104 will be charged, maintaining the input to the device 112 high so that its output is low and the safety signal therefore will not be present on the line 101. The device 110 is an eight bit serial shift register which is cleared at the byte rate from the multivibrator 133 of the delay circuit 94 if transmission is proceeding normally. Under these conditions, the counter 69 clocks the shift register at the byte rate and the output of the shift register continuously remains low. In consequence, the output of the multivibrator 111 remains high and the capacitor C104 remains charged. If transmission is interrupted to the receiver 74A, the multivibrator 133 ceases to clear the shift register 110 and if this condition persists for enough byte periods, the shift register will then produce a continuous high output, triggering the device 111 rapidly to discharge the capacitor C104. The multivibrator 112 is thus triggered so that its normally low output goes high, producing the safety signal at the line 101. When the fault is repaired and transmission resumes, the capacitor C104 will recharge slowly enough to allow the system to stabilize before the signal on the line 101 goes low to permit resumption of the data exchange. The capacitor C104 thus acts as a power-up delay device under actual power-up conditions as well as under a condition in which power remains on while a broken transmission line, for example, is repaired. In either case, the relatively slow rate of capacitor charging allows time for the system to "settle" or synchronize.

Figure 6:
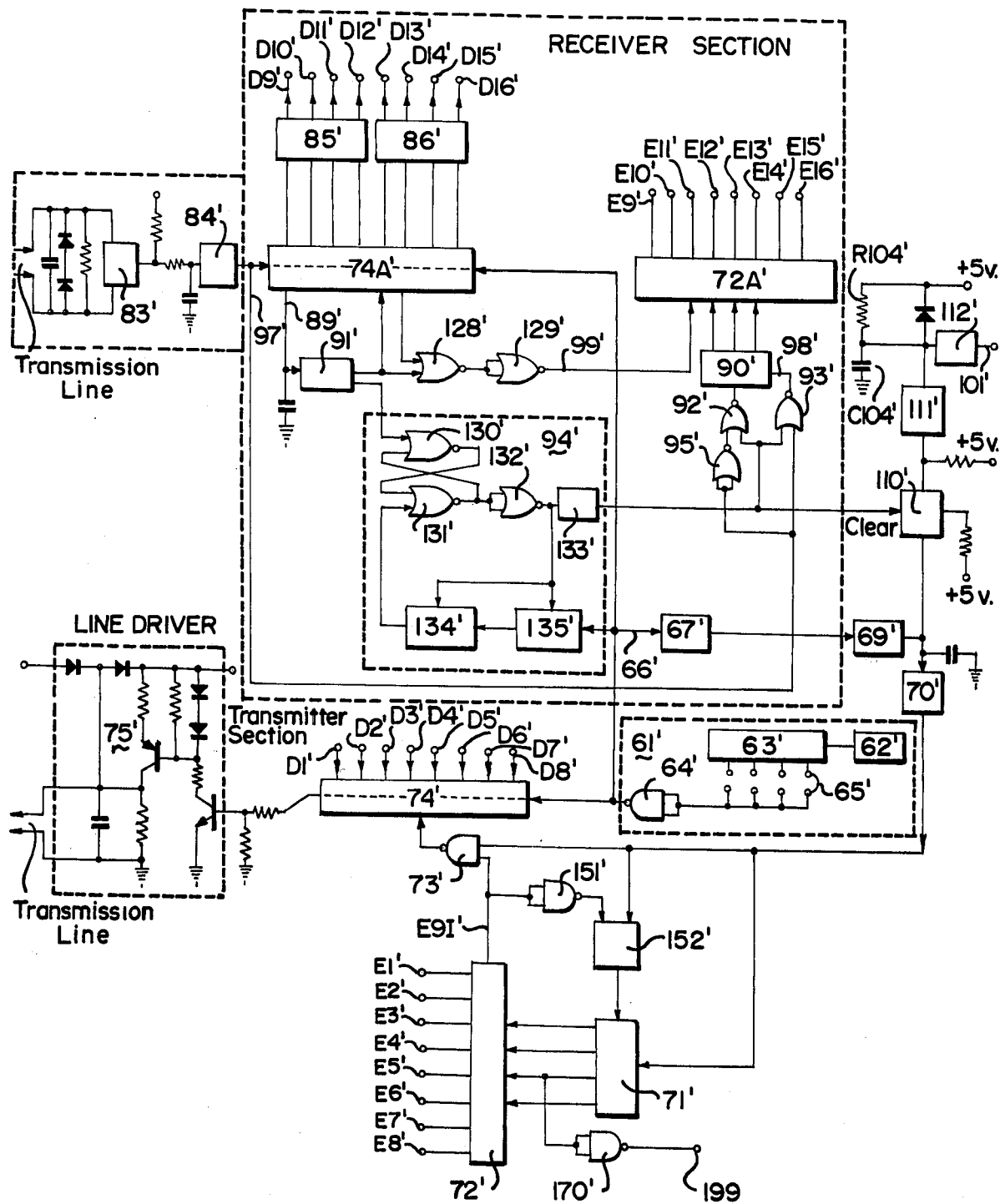
FIG. 6 is a circuit diagram illustrating a unit in the controller multiplexer terminal.

A similar is employed at the controller terminal units as shown in FIG. 6 where the components described in conjunction with FIG. 3 are identified by corresponding primed reference characters.

Figure 8:
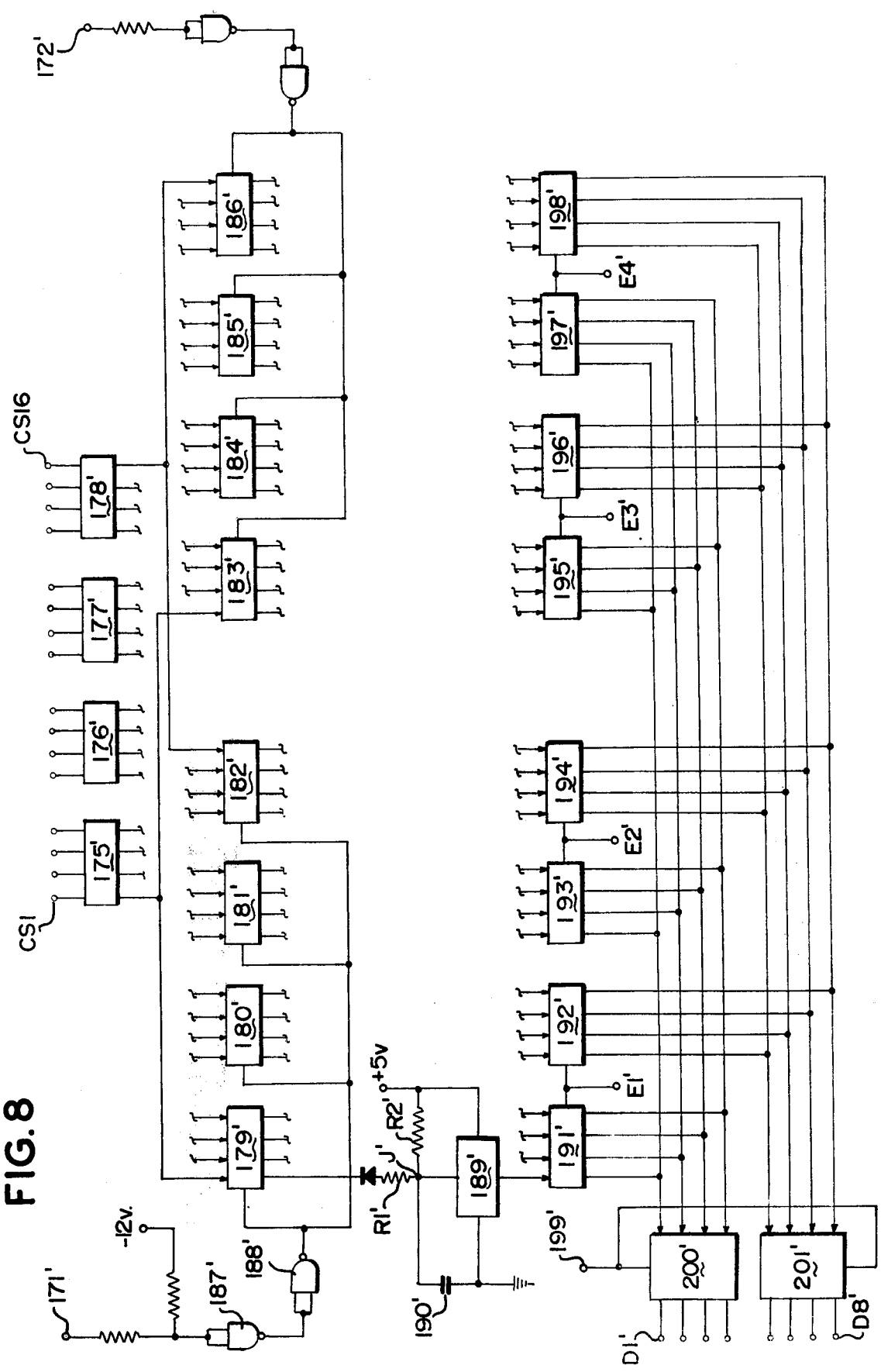
FIG. 8 is a circuit diagram of a controller-associated transmitter multiplexer matrix.

The principles of transmitter multiplexing at the controller terminal 15 are illustrated in FIG. 8.

The controller 12 used in the embodiment of the invention shown and described herein is capable of providing 256 command signal outputs and of accepting 512 inputs. Therefore, whereas there are 32 inputs available for each controller demultiplexer there are only 16 outputs available for each controller multiplexer, these command signal outputs for the multiplexer being indicated as CS1 – CS16 in FIG. 8. As will be described later, the output gates 200' and 201' are enabled by a signal on the line 199' to ouput the relevant command signals during the first four byte periods of each cycle and to provide high outputs (0 logic level) during byte periods five-eight, the ninth byte period being the dead time dictated by blocking of the gate 73' (FIG. 6).

In the matrix of FIG. 8, there are four buffer gates 175' – 178', each having four command signal inputs and corresponding output terminals. There are two sets of four coincidence gating circuits 179' – 186'. Every such gate has four inputs from one of the devices 175' – 178' and the outputs of each device 175'– 178' are connected to two of the coincidence gating circuits 179' – 186'. Enabling signals to each group of four devices are provided by the controller 12 and these are the sequential signals at the lines 171' and 172' of the four lines 171' – 174' in FIG. 6. The controller 12 outputs 16 command signals simultaneously (also inputing 16 condition responsive signals simultaneously) so that the enabling signals at the lines 171' – 174' are maintained for two byte periods. In FIG. 8, the signal at the line 171' enables the four gates 179' – 182' so that their sixteen command signal outputs are applied to the corresponding latches 191' – 194'. The enabling signal at the line 171' drives the inputs to the NAND gate 187' high so that the inputs to the NAND gate 188' go low to produce the high enabling signal.

The outputs of the groups of gates 179' – 182' and 183' – 186' are connected to the corresponding inputs to the groups of gates 191' – 194' and 195' –198', through pulse-shaping circuits, one of which is illustrated in detail in FIG. 8. As shown, the pulse-shaping circuit comprises a Schmitt trigger device 189', the input voltage level to which at the junction J' is controlled by charging of the capacitor 190' through the resistor R1' from the +5V source and discharge of the capacitor 190' through the resistor R2' in response to a command signal pulse passed by the gate 179'.

Each set of four gates 179' - 182', 183' - 186' is enabled by a signal 171' or 172' for a period equal to two byte periods. During this period, two address signals will appear sequentially from the decoder 72' of FIG. 6. Thus, while the gates 179' - 182' are enabled, first the two output gates 191' and 192' will be enabled by the signal E1' and then the output gates 193' an 194' will be enabled by the signal E2', and so on for the gates 195' and 196', 197' and 198' during the first four byte periods of each cycle. Each pair of the output gates is coupled to the command signal inputs D1' - D8' to the transmitter 74' through the gates 200' and 201'. These latter gates are enabled by the signal at the terminal 199' for only the first four output states of the counter 71' (FIG. 6) and, for this purpose, the NAND gate 170' is connected to that output line of the counter 71' which remains high during these first four states. At the fifth output state of the counter 71', the signal at the terminal 199' goes low to disable the gates 200' and 201' and this condition prevails until the counter 71' is reset.

When the signal at the terminal 199' is low during the fifth through the eighth byte periods of each cycle, all of the outputs D1' - D8' to the transmitter 74' are high so that all command signal bits transmitted during these periods are of 0 logic level (high) to the machine terminal receiver 74A. It will be appreciated that the controller receiver demultiplexer, FIG. 7, receives condition-defining signals from the machine terminal transmitter 74 during each of the eight byte periods of each cycle but, as is the case with the matrix of FIG. 8, the demultiplexer matrix outputs 16 condition-responsive signals simultaneously to the controller 12, corresponding to signals 1S1 - 1S16 of FIG. 7. It should be understood, of course, that one set of 16 signals is produced by the set of four gates G9AC, G9BC, G10AC and G10BC, and so on for all sixteen of these gates, and each set of four gates being enabled in turn by the lines 103, 104, 105 and 106.

To illustrate one embodidment of the invention, the following circuit components are listed:

| Reference character | Component |
|---|---|
| 102 | DM7400N National |
| 92,93,95,107,128-132,141,143 | DM7402N " |
| 175'-178' | DM7404N " |
| 85,86 | DM7408N " |
| 110 | DM7416N " |
| 121 | DM7430N " |
| 64,73,119,122-124,126,127,159,160 162,179'-188',200',201' | DM7437N " |
| 72,72A | DM7442N " |
| 69 | Dm7492N " |
| 63,67,71,90,134,135 | DM7493N " |
| G1A-G8A,G1B-G8B,191'-198' | DM8093N " |
| G9A-G16A,G9B-G16B,G9AC-G16AC, G9BC-G16BC | DM8551N " |
| 70,91,133,152 | DM7412N " |
| 84,111,112,114,189' | NE555V Signetics |
| 102A | 206-004 CTS |
| 120 | 260-8 CTS |
| 83,125 | MCL610 Monsanto |

While the invention has been described with reference to a preferred embodiment, it will be understood by those skilled in the art that various changes my be made and equivalents may be substituted for elements thereof without departing from the scope of the invention. Various individual components or devices shown in the various figures are known in the art. The specific description of their individual strructure and operation can be found, for example, in the book entitled *Digital Integrated Circuits*, published by National SemiConductor Corp., Santa Clara, California, and copyrighted 1974. This information as well as the relevant patents referred to therein, are incorporated by reference in this application. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A multiplexing machine control communications system for controlling a plurality of machines from a programmable controller, comprising a multiplexer controller terminal for receiving condition-defining information signals representing the operational functions of a plurality of independently operable multifunctioning machines and transmitting in response thereto predetermined condition-responsive command signals to control selected functions of each of said machines, a programmable controller coupled to said multiplexer controller terminal to provide a source of said predetermined condition-responsive command signals for controlling said machine functions in response to said condition-defining information signals, a multiplexer machine terminal coupled to each one of said plurality of independently operable multifunctioning machines to transmit condition-defining information signals responsive to the operational functions of a machine coupled thereto and to receive in response thereto selected ones of said predetermined condition-responsive command signals, an input and output converter coupled between said multiplexer machine terminal and a machine coupled thereto for coupling said information and command signals therebetween, respective transmission lines for connecting said multiplexer controller terminal in parallel with each of said multiplexer machine terminals, and said multiplexer controller terminal enabling communication between said multiplexer controller terminal and each of said multiplexer machine terminals.

2. A communications system as in claim 1 wherein said multiplexer controller terminal includes means for receiving and transmitting data in serial format through said respective transmission lines to each of said multiplexer machine terminals, and said multiplexer machine terminals include means for converting the binary data received from said multiplexer controller terminal into a serial format for coupling through the said associated input and output converters to a machine coupled thereto.

3. A communications system as in claim 1 further including actuator means coupled with each of said machines for defining the status and position of said machine by logic levels convertible to binary data, and each of said multiplexer machine terminals including means for converting said binary data into parallel format and converting said parallel binary data into serialized format for transmission through one of said respective transmission lines coupled between the said multiplexer machine terminal and said multiplexer controller terminal.

4. A communications system as in claim 1 where the controller terminal provides data in serial format through the transmission lines at a rate greater than that of the rate at which each machine can utilize the data, thereby enabling a single controller terminal to provide data through each of the transmission lines to all the machines at a rate enabling continuous uninterrupted operation of each machine.

5. A control system including
a programmable controller for providing binary data to a plurality of separately operable multi-functioning machines,
a single multiplexer controller terminal,
a plurality of multiplexer machine terminals each including means for processing binary data,
respective transmission lines connecting the controller terminal in parallel to each of the machine terminals,
said controller terminal coupling data in serial format through the transmission lines to each of the machine terminals,
each of said machine terminals converting the serial data received from the multiplexer controller terminal to parallel data in selected groups,
respective input/output converters for said machines,
gate means for selectively coupling the groups of parallel data through the input/output converter to the respective machines,
each of said machine terminals arranged to receive data in groups of parallel bits through the respective input/output converter for defining the status and position of the respective machine, and
each machine terminal including means for serializing the data received from the respective machine and transmitting the serialized data through the transmission lines to the controller.

6. A control system as in claim 5 wherein the controller terminal provides serialized binary data in selected sequence to each of the machine terminals, and
each machine terminal provides information in sequence to said controller terminal to thereby provide a repetitive sequential control of the separably operable multifunctioning machines.

7. A control system as in claim 5 wherein each machine terminal couples data defining the status and position of the respective machine through the multiplexer controller terminal on to the controller, and
means in said controller for comparing the data received from each machine terminal and providing data in response thereto even when the comparison indicates that the data to be provided by controller conforms with the data just received from the machine terminal thereby to provide a redundant and more fail safe system.

8. A control system as in claim 5 wherein each machine terminal comprises a first receiver/transmitter portion and a second receiver/transmitter for processing data from the controller and from the associated machine concurrently.

9. In a control system for multi-functioning machines having a plurality of condition-responsive devices indicative of the multi-functioning and commanded devices for effecting the multi-functioning, the combination of:
multiplexer means having a plurality of groups of input terminals and a single group of output terminals for sequential and mutually exclusive connection to each group of input terminals, each group of input terminals being connected with a different group of condition-responsive devices;
parallel-to-series converter means having a group of input terminals connected with said single group of output terminals for converting the parallel condition-responsive signals appearing at said group of output terminals sequentially to serial form;
serial-to-parallel converter means receiving sequential groups of command signals of serial form and having a group of output terminals for providing each group of command signals in parallel form;
demultiplexer means having a group of input terminals connected with the output terminals of said series-to-parallel converter means and a plurality of groups of output terminals for sequentially providing said groups of command signals in parallel form, each group of output terminals of the demultiplexer means being connected to a different group of the commanded devices to deliver command signals thereto;
controller means connected to the output of said parallel-to-series converter means for receiving the sequential groups of condition-responsive signals and connected to said series-to-parallel converter means for transmitting said sequential groups of serial command signals; and
clock means connected with said multiplexer means and said demultiplexer means for causing them repetitively to cycle, each cycle involving the reception of sequential groups of command signals and the concurrent transmission of said sequential groups of condition-responsive signals from the condition-responsive devices.

10. In a system as defined in claim 9 wherein said clock means includes an oscillator circuit connected with both of said converter means to serialize them in unison, a first counter connected between said oscillator circuit and said multiplexer means to sequence the multiplexer means, and a second counter connected between said oscillator circuit and said demultiplexer means to sequence the demultiplexer means.

11. In a system as defined in claim 10 wherein said series-to-parallel converter means includes an end-of-sequence output terminal providing a signal at the end of each group of command signals and connected to said second counter to enable incrementing thereof.

12. In a system as defined in claim 11 including means connected to the input of said series-to-parallel converter means and to said end-of-sequence output terminal for allowing said second counter to increment only when a sequence of command signals is immediately followed by another sequence of command signals.

13. In a system as defined in claim 12 including means for resetting said first counter at the end of each sequence of groups of condition-responsive signals.

14. In a system as defined in claim 13 including means for resetting said second counter when said end-of-sequence signal appears and a subsequent group of command signals does not immediately follow.

15. In a system as defined in claim 10 including means for resetting said first counter at the end of each sequence of groups of condition-responsive signals.

16. In a system as defined in claim 15 including means for resetting said second counter when said end-of-sequence signal appears and a subsequent group of command signals does not immediately follow.

17. In a system as defined in claim 11 including means for resetting said first counter at the end of each sequence of groups of condition-responsive signals.

18. In a system as defined in claim 17 including means for resetting said second counter when said end-of-sequence signal appears and a subsequent group of command signals does not immediately follow.

19. In a system as defined in claim 10 including means for resetting said second counter when said end-of-sequence signal appears and a subsequent group of command signals does not immediately follow.

20. In a system as defined in claim 11 including means for resetting said second counter when said end-of-sequence signal appears and a subsequent group of command signals does not immediately follow.

21. In a system as defined in claim 12 including means for resetting said second counter when said end-of-sequence signal appears and a subsequent group of command signals does not immediately follow.

22. A control system for multi-functioning machines comprising, in combination:
- a controller terminal system for periodically providing a sequence of groups of serial command signals and concurrently receiving a sequence of groups of serial condition-responsive signals;
- a machine terminal system for periodically providing said sequence of groups of serial condition-responsive signals and for concurrently receiving said sequence of groups of serial command signals;
- each terminal system including a receiver section, a transmitter section, a demultiplexer connected to said receiver section and a multiplexer connected to said transmitter section;
- the multiplexer of said machine terminal system having a plurality of groups of input terminals adapted to be connected to different groups of machine-associated condition-responsive devices and a single group of output terminals, the machine terminal system also including a parallel-to-series converter having a group of input terminals connected to said single group of output terminals and an output line connected to said controller terminal system;
- the demultiplexer of said machine terminal system having a single group of input terminals adapted to be connected in parallel with a sequence of command signals and a plurality of groups of output terminals connected to different groups of machine-associated control devices, the machine terminal system also including a series-to-parallel converter having an input line connected with said controller terminal system and a group of output terminals connected to the single group of input terminals of such demultiplexer;
- said controller terminal system including a series-to-parallel converter connected to said output line and having a group of output terminals adapted to be connected to a programmable controller, a multiplexer having a plurality of groups of input terminals connected to the programmable controller and a group of output terminals, and a parallel-to-series converter connected to said group of output terminals of such multiplexer and having an output line connected to said input line of the series-to-parallel converter of the machine terminal system; and
- said machine terminal system including clock means for operating its multiplexer, demultiplexer, parallel-to-series converter and serial-to-parallel converter periodically to transmit a sequence of groups of condition-responsive signals and concurrently to receive a sequence of groups of command signals, and said controller terminal system also including clock means for operating its multiplexer, series-to-parallel converter and parallel-to-series converter concurrently to receive said sequence of groups of condition-responsive signals and to transmit said sequence of groups of command signals.

23. In a control system for multi-functioning machines, the combination of:
- a controller terminal having a plurality of input lines adapted to receive command signals from a programmed controller and a plurality of output lines adapted to provide condition-responsive signals to a programmed controller;
- a machine terminal having a plurality of input lines adapted to receive said condition-responsive signals from at least one multi-functioning machine and a plurality of output lines adapted to provide said command signals to at least one multi-functioning machine;
- said controller terminal including transmitter means for transmitting a repetitive sequence of said command signals in which each sequence involves a series of different groups of said command signals, receiver means for receiving a repetitive sequence of said condition-responsive signals in which each sequence involves a series of different groups of said condition-responsive signals, and free-running clock means for driving said transmitter means and said receiver means concurrently to transmit and to receive said sequences of signals; and
- said machine terminal including receiver means connected to said transmitter means of the controller terminal for receiving said repetitive sequence of command signals, transmitter means connected to said receiver means of the controller terminal for transmitting said repetitive sequence of condition-responsive signals, second free-running clock means connected to the receiver means and the transmitter means of said machine terminal for driving them concurrently to transmit and receive, and control means connecting said receiver means and said transmitter means of the machine terminal to slave them to the transmitter means of said controller terminal.

24. In a control system as defined in claim 23 wherein said control means comprises a first counter which routes each group of command signals received, a second counter which controls which particular group of condition-responsive signals is transmitted, and reset means for simultaneously resetting each counter in response to the ending of a sequence transmitted from said controller terminal.

25. In a control system as defined in claim 24 wherein said machine terminal includes a demultiplexer matrix connected to its receiver means and controlled by said first counter, and a multiplexer matrix connected to its transmitter means and controlled by said second counter.

26. In a control system as defined in claim 25 wherein said controller terminal includes a demultiplexer matrix connected to its receiver means, a multiplexer matrix connected to its transmitter means, a third counter which controls said demultiplexer matrix of the controller terminal, a fourth which controls said multiplexer matrix of the controller terminal, and means for repetitively incrementing said third and fourth counters through said sequence followed by an intersequence delay time.

27. A machine control system comprising, in combination:
- a programmable controller having a plurality of groups of input lines for receiving condition-responsive digital signals and a plurality of groups of corresponding output lines for providing machine command digital signals responsive to said condition-defining signals;
- a plurality of groups of condition-responsive sensors and at least one multi-functioning machine having a plurality of groups of control inputs for receiving said command signals;
- controller multiplexer terminal means connected to said plurality of groups of input lines and to said plurality of groups of corresponding output lines for transmitting a sequence of groups of command signals while receiving a corresponding sequence of condition-responsive signals;
- machine multiplexer terminal means connected to said sensors and to said multi-functioning machine control inputs for transmitting said corresponding sequence of condition-responsive signals while receiving said sequence of command signals;
- a first free-running clock controlling said controller multiplexer terminal means and a second free-running clock controlling said machine multiplexer terminal means; and
- said machine multiplexer terminal means icluding means for slaving the transmission of said condition-responsive signals to the transmission of said command signals.

* * * * *